(12) United States Patent
Frizzell et al.

(10) Patent No.: US 6,629,003 B1
(45) Date of Patent: Sep. 30, 2003

(54) BATCH PROCESSING CONTROL SYSTEM RECIPE MANAGEMENT AND BATCH INFORMATION SYSTEM

(75) Inventors: James G. Frizzell, Marion, IA (US); Gregory R. Smith, Marion, IA (US); James G. Spencer, Marion, IA (US)

(73) Assignee: Vector Corporation, Marion, IA (US)

( * ) Notice: Subject to any disclaimer, the term of this patent is extended or adjusted under 35 U.S.C. 154(b) by 0 days.

(21) Appl. No.: 09/205,708

(22) Filed: Dec. 4, 1998

(51) Int. Cl.[7] .......................... G05B 11/01; G05B 15/00; G06F 19/00; G09G 5/00
(52) U.S. Cl. ........................... 700/97; 700/17; 700/19; 700/83; 345/771; 345/967; 345/970
(58) Field of Search ............................... 700/9, 17, 19, 700/83, 97, 108, 90, 95; 345/771, 772, 773, 839, 965–967, 970

(56) References Cited

U.S. PATENT DOCUMENTS

| | | | |
|---|---|---|---|
| 4,554,887 A | | 11/1985 | Yoakam et al. ............. 118/666 |
| 4,675,147 A | * | 6/1987 | Schaefer et al. ............ 376/245 |
| 5,291,190 A | * | 3/1994 | Scarola et al. ............. 340/3.32 |
| 5,576,946 A | * | 11/1996 | Bender et al. ................ 700/17 |
| 5,591,299 A | * | 1/1997 | Seaton et al. ............... 700/121 |
| 5,777,876 A | * | 7/1998 | Beauchesne ................. 700/95 |
| 6,163,740 A | * | 12/2000 | Beltracchi ................... 700/286 |
| 6,288,650 B2 | * | 9/2001 | Chavand ..................... 340/679 |
| 6,336,053 B1 | * | 1/2002 | Beatty ........................ 700/108 |
| 6,415,193 B1 | * | 7/2002 | Betawar et al. ............... 700/97 |

OTHER PUBLICATIONS

Computab II Controller Operation & Maintenance Instructions 7–15–96.
Compuflo Controller Operation and Maintenance Instructions.

* cited by examiner

Primary Examiner—Leo Picard
Assistant Examiner—Ryan Jarrett
(74) Attorney, Agent, or Firm—Schiff Hardin & Waite (57) ABSTRACT

In a method and system for operating a batch processing machine which produces a product, a recipe is created with a computer for batch processing of the product, the recipe having a plurality of steps. For at least one of the steps the machine is first manually operated and a snap shot is taken of control element operating parameters. The snap shot is then used for assisting in the creation of at least one of the method steps of the recipe. The recipe then is used to automatically process a batch of the product. Also, the batch processing machine can switch between a recipe editing screen and a recipe matrix screen, the recipe matrix screen providing control element indicia on one axis and steps of the process on a perpendicular axis, and wherein at locations of the matrix control element parameter values are displayed. Also for management reporting, a format of a management report can be changed for a given batch after running the batch. Furthermore, in a process display screen of the batch processing control software, the screen shows a diagram of the batch processing machine substantially from input to output and has display indicia for actual and set points values of various control element parameters of the machine with lead lines from those display indicia down to the control elements of the machine.

6 Claims, 9 Drawing Sheets

FIG. 4 MANUAL PROCESS DISPLAY

INFORMATION REPORT AND EDIT 81

| New Report Format | Open Report Format | Save Report Format | Show Report | Print Preview | Save Report | Show Trend | Report Configuration 82 |
|---|---|---|---|---|---|---|---|
| Name | Start Date/ Time | Stop Date/ Time | Report | | Alarms | | Activity |

Batch Name:
Operator:

PROCESS    INLET    IN TEMP    PAN         HICOATER  HICOATER
TIME       TEMP.    SETPOINT   PRESSURE    AIRFLOW   AIR SET
           DEG C    DEG C      INWC        CFM       CFM

BATCH PROCESSING CONTROL SYSTEM RECIPE MANAGEMENT AND BATCH INFORMATION SYSTEM

BACKGROUND OF THE INVENTION

Batch processing control systems are known having recipe management and batch information systems from earlier U. S. Pat. Nos. 4,554,887, and 5,576,946. The system disclosed in the '887 patent was a predecessor system to that disclosed in the instant application and was known as the CompuTab™ and CompuFlo™ systems (Trademarks of Vector Corporation). The CompuTab™ and CompuFlo™ systems were subsequently improved upon by prior art systems known as the CompuTab II™ and CompuFlo II™ systems (Trademarks of Vector Corporation). The present system disclosed in this application and known as the Compu3™ (Trademark of Vector Corporation) is an improvement on the CompuTab II™ and CompuFlo II™ systems.

In the CompuTab II™ and CompuFlo II™ systems, batch processing is controlled in a batch processing machine. Such a batch processing machine can, for example, be a machine used in the pharmaceutical industry for the manufacture of tablets, capsules, or the like. Such machines are complicated and perform many steps which as a group are identified herein as a "recipe" for the production of a product. Each time the product is run, it is known as a "batch". Various process variables, such as airflow through the machine and the temperature of air must be controlled during the steps being performed according to the recipe for a particular product.

The creation of a recipe can be a difficult procedure, since experiments in many cases need to be performed when designing each step of the recipe. Furthermore, once a recipe has been created for a particular product, it is important that the management of the manufacturing companies be able to receive information concerning the running of that recipe for a particular batch. This information is also important for management and for Government agencies who regulate the operation of such a machine, such as in the pharmaceutical industry, and it is important that information concerning the running of a particular batch be safely maintained and available for inspection.

In the prior art CompuTab II™ and CompuFlo II™ systems, although batch processing control was provided along with recipe management and the provision of batch information, there were disadvantages to the prior art system relative to the way the system was operated and manipulated via computer screens.

SUMMARY OF THE INVENTION

It is an object of the present invention to improve on the CompuTab II™ and CompuFlo II™ systems and to provide improved ease of operation by an operator who is operating the system.

It is a further object of the present invention to simplify the operator/computer interface for the design of recipes, for the operation and running of those recipes, and to simplify and to provide more flexibility for the batch information system outputs.

According to the invention, a method and system is provided for operating a batch processing machine which produces a product. A computer is provided. A recipe is created with the computer for batch processing of the product, the recipe having a plurality of steps. For any of the steps, the machine can be manually operated and a snap shot be taken of operating parameters of the machine. That snap shot is then stored within the system for future retrieval. A recipe can be created with the computer and the stored snap shot can be used for creating any of the method steps of the recipe. The created recipe is used to automatically process a batch of the product. Note that the present invention also allows the operator to generate recipes without the use of snap shots.

Also, according to the invention, a method and system is provided for operating a batch processing machine for producing a product wherein a recipe is created for running batches of the product, the recipe having a plurality of steps. The recipe is created by use of an editing screen of batch processing control software by which, in a computer, individual steps of the recipe are represented by graphical icons which reflect the automatic process that the machine is to execute. A recipe matrix is also provided by which control element indicia of the machine are set forth at one axis and steps of the process are set forth on a perpendicular axis, and wherein at locations of the matrix, parameter values are displayed for the control elements which correspond with respective steps for the recipe being created. The computer has the capability of switching between the recipe editing screen and the recipe matrix screen. Prior art systems were not able to switch between these types of screens without losing and/or limiting the amount of information that can be stored within the recipe. The recipe is used to automatically operate the batch processing machine.

Also according to a method and system of the invention for operating a batch processing machine for producing the product, the batch processing machine is controlled with a computer operated by batch processing control software capable of either manually or automatically running recipes for creating batches of products on the batch processing machine. A batch management reporting system is provided as an output from the computer as an information report illustrating at various time intervals in the batch processing during either manual or an automatic mode, values of various control element parameters associated with the batch processing in the machine. A format of the batch management report can be changed after running a batch so that values of parameters for different control elements not shown in the original report for the batch are arranged in a different sequence for output and a new batch report of the changed format is generated. Manipulation of these process parameters into customized reports for management is unique.

Also according to the invention, a pop-up batch check screen is provided for allowing an operator to select either an automatic process screen or a manual process screen and wherein a section of the process screen has buttons either for manual processing or automatic processing depending upon which screen is called up. The pop-up batch check screen ensures that a batch number, entered by the manufacturer to identify the product being manufactured, has not been used in the past.

Also according to the invention, a process display screen is provided for operating the batch processing where the process display screen shows a diagram of the batch processing machine substantially from input to output and has display indicia for actual and set point values of various control element parameters of the machine with lead lines from those display indicia down to control elements of the machine to which the control element parameters correspond.

DESCRIPTION OF THE PREFERRED EMBODIMENTS

Figure 1:
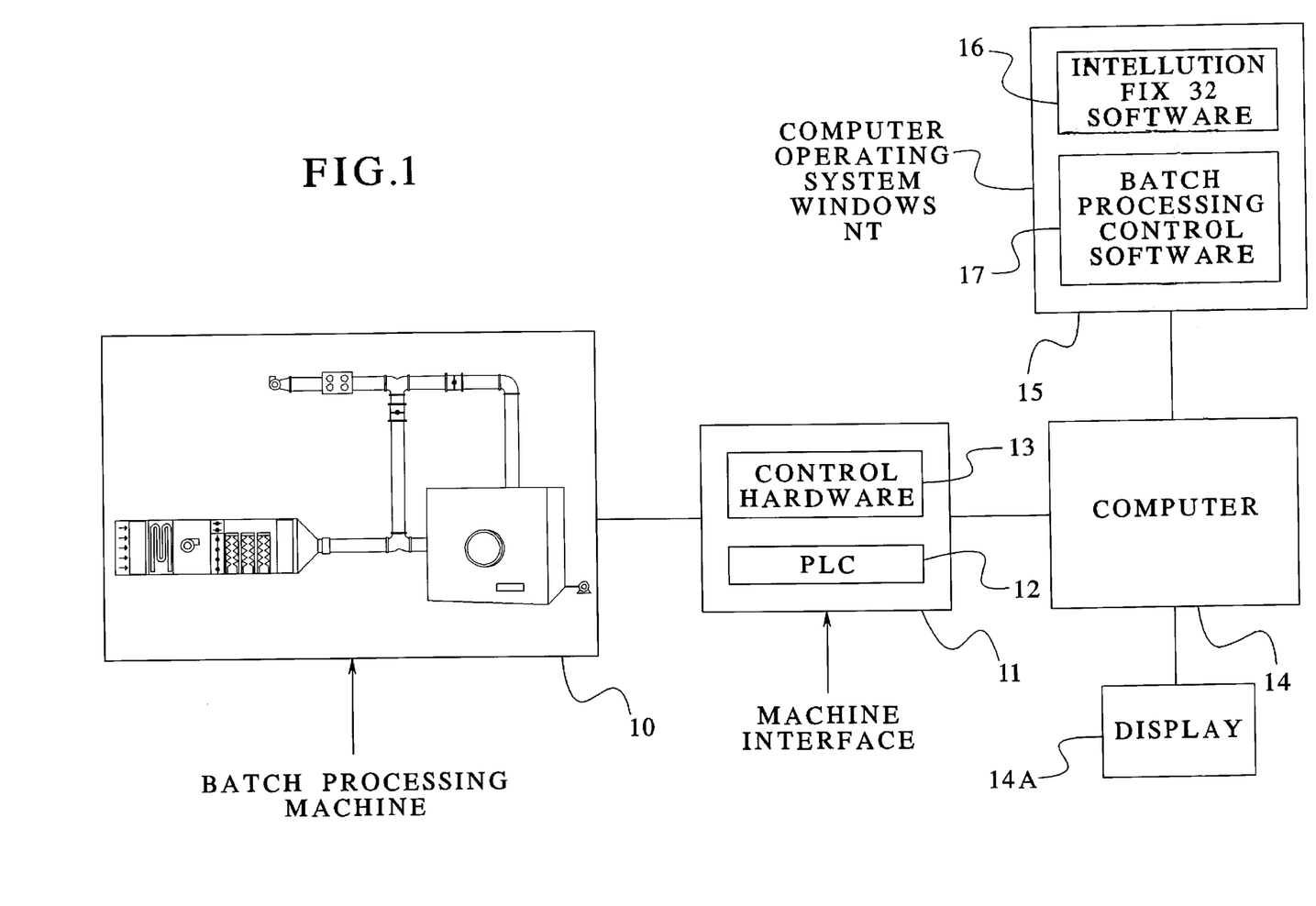
FIG. 1 is a block diagram showing the computer system, operating system, interface, and batch processing machine all employed in the batch processing control system according to the invention.

In the block diagram of FIG. 1, a batch processing machine 10 is illustrated such as for the manufacture of tablets, capsules, granular material, or any other material or liquid which is to be batch processed. Although an example of a machine in the pharmaceutical industry has been shown, it should be understood by those skilled in this art that any type of machine involved in batch processing of products is considered to be within the scope of the present invention.

The batch processing machine 10 connects the machine interface 11 having well known prior art components such as a PLC (programmable logic controller) 12 available from a number of manufacturers, and the control hardware 13 which can be easily designed by those skilled in the art for matching the inputs and outputs of the batch processing machine 10 together with the PLC 12 to the inputs and outputs of a computer 14. As is known to those skilled in this art, the specific design for the control hardware 13 and programming of the PLC 12 depends on the particular type of batch processing machine 10 being operated by the batch processing control system of the invention.

The computer 14, as is well known to those skilled in this art, is operated according to a computer operating system. In the present invention, the computer operating system is a Windows NT™ (Trademark of Microsoft-Corporation) system 15. The Windows NT™ system is well known to those skilled in this art as being a product of the Microsoft Corporation. There are two programs being operated. One is a program known to those skilled in this art known as the Intellution FIX 32™ (Trademark of the Intellution Company) indicated at 16. 17 is the batch processing control software of the present invention operating in conjunction with the Intellution FIX 32™ software 16 to operate the computer 14 which in turn controls the batch processing machine 10.

The batch processing software runs in conjunction with the Intellution FIX 32™ (Trademark of the Intellution Company) software 16. The Intellution FIX 32™ software is a Supervisor Control and Data Acquisition system (SCADA) by the Intellution Company.

Certain program modules of the batch processing control software is written in the Visual Basic and Visual C++ programming languages by the Microsoft Corporation.

Hereafter, the screens appearing on the face of the computer display 14A according to the Windows NT operating system shall be described. These screens are in effect a detailed flow chart for the batch processing control software 17 of the present invention and those skilled in this art can perform the invention from the detailed description given in the following drawing Figures relating to the display screens.

Figure 2:
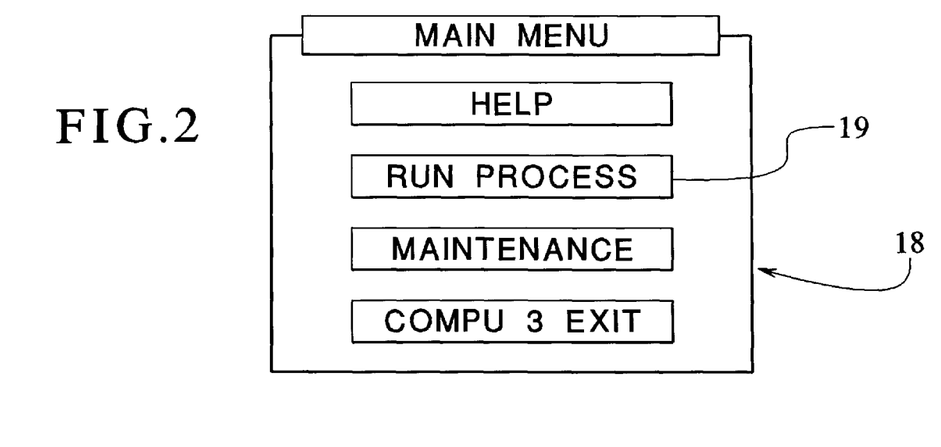
FIG. 2 shows a main menu of the batch processing control software according to the invention.

The FIG. 2 main menu screen contains a help function which, is as known to those skilled in this art, explains to a user of the software the functioning thereof. The run process button is clicked on by the user to pull up the run process screen and the batch pop-up screen which overlays the run process screen shown in FIG. 3. The maintenance button does not relate to the present invention and therefore is not described hereafter. Finally, the Compu-3™ exit button is employed when it is desired to exit the batch processing control software 17 known as the Compu-3™.

Figure 3:
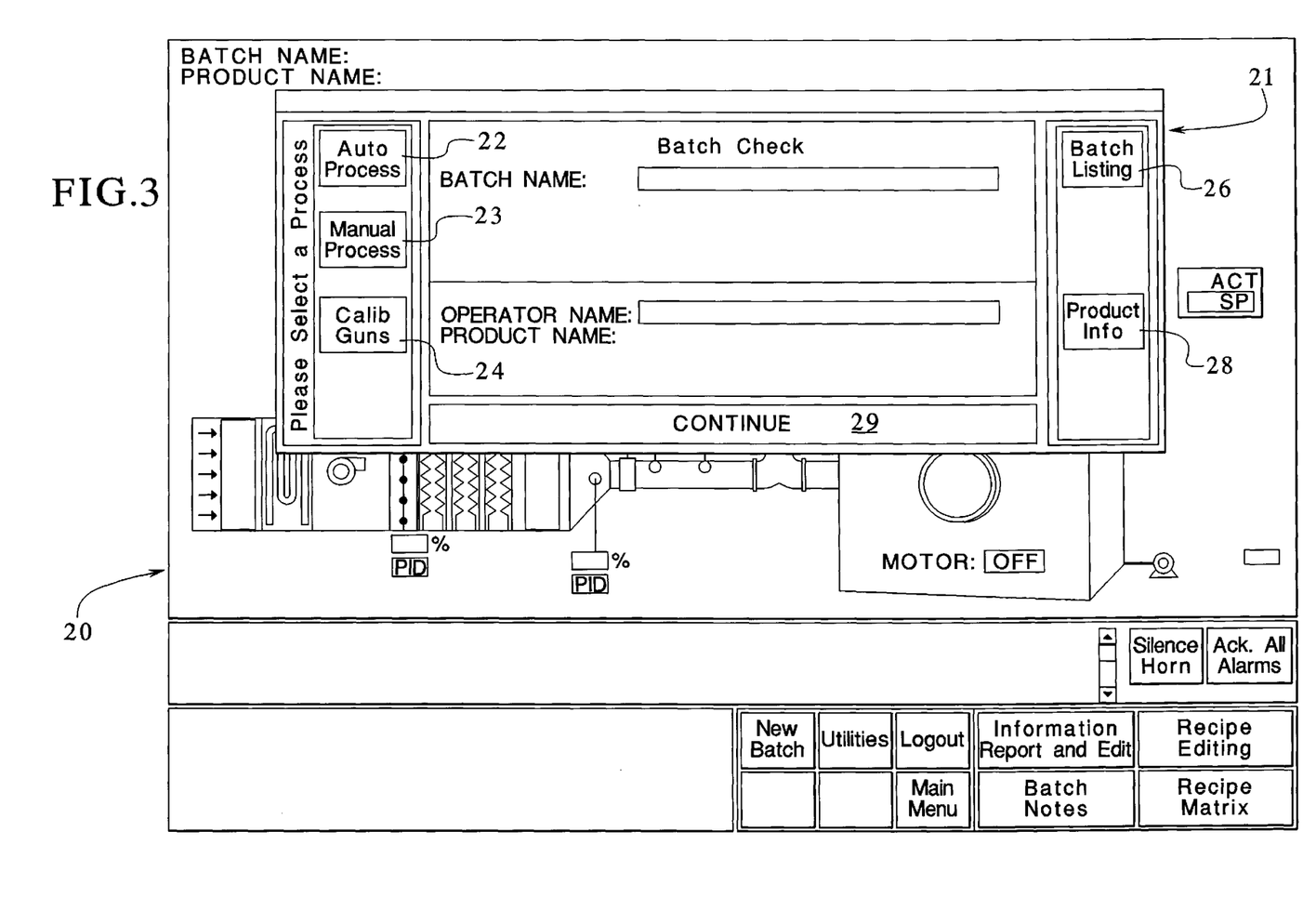
FIG. 3 shows an overall control display screen following the main menu screen with an overlaid batch check pop-up screen.

When the run process button 19 is activated on the main menu screen 18, the main run process screen 20 shown in FIG. 3 appears on the computer display along with the batch check pop-up screen 21 which overlays the run process screen 20.

On the batch check pop-up screen 21, the batch name can be entered along with the operator name and product name. Spray guns which introduce product into the batch processing machine can be calibrated by activating the calibrate guns button.

If a manual process is to be run in which the operator controls the machine manually via the computer and associated display screen, then the manual process button 23 is activated. Alternatively, to automatically run a previously created recipe, the auto-process button 22 is activated.

If the operator desires to see a listing of batches, he can activate button 26. Finally, for information about a particular product, button 28 can be activated.

The continue button 29 is activated after the above information has been entered and one or more buttons have been pressed as described above. The pop-up screen 21 then disappears and the main process run or display screen 20 is displayed. If the manual button was pressed, then in the lower lefthand corner the manual process specific buttons 30 appear. Alternatively, as described hereafter if the auto-process button 22 is pressed on the pop-up batch check screen, then the automatic process specific buttons 31 shown in FIG. 5 appear in the lower left-hand portion of the screen.

The manual process display screen shown in FIG. 4 (display screen 20 with manual process buttons 30) will now be described in detail. In the upper left-hand comer of the screen 20 the batch name 62A and product name 62B previously selected are displayed. The particular batch processing machine which is being operated by the system of the invention is essentially illustrated in diagrammatic form. This machine 10, by way of example, may have an air inlet 32, a filter 33, a chiller section 34, an inlet blower 35, a heat control section 36, another filter 37, and an outlet duct 38 leading to a mixing or processing coating unit 39 which holds the product and which has associated with it a motor 40.

An exhaust blower 41 is connected via a duct 42 to a dust collector 43 which passes through a bypass damper 44 through a duct down to the mixing unit 39. A bypass duct 45 containing an exhaust damper 46 also leads down into the mixing unit 39.

Figure 4:
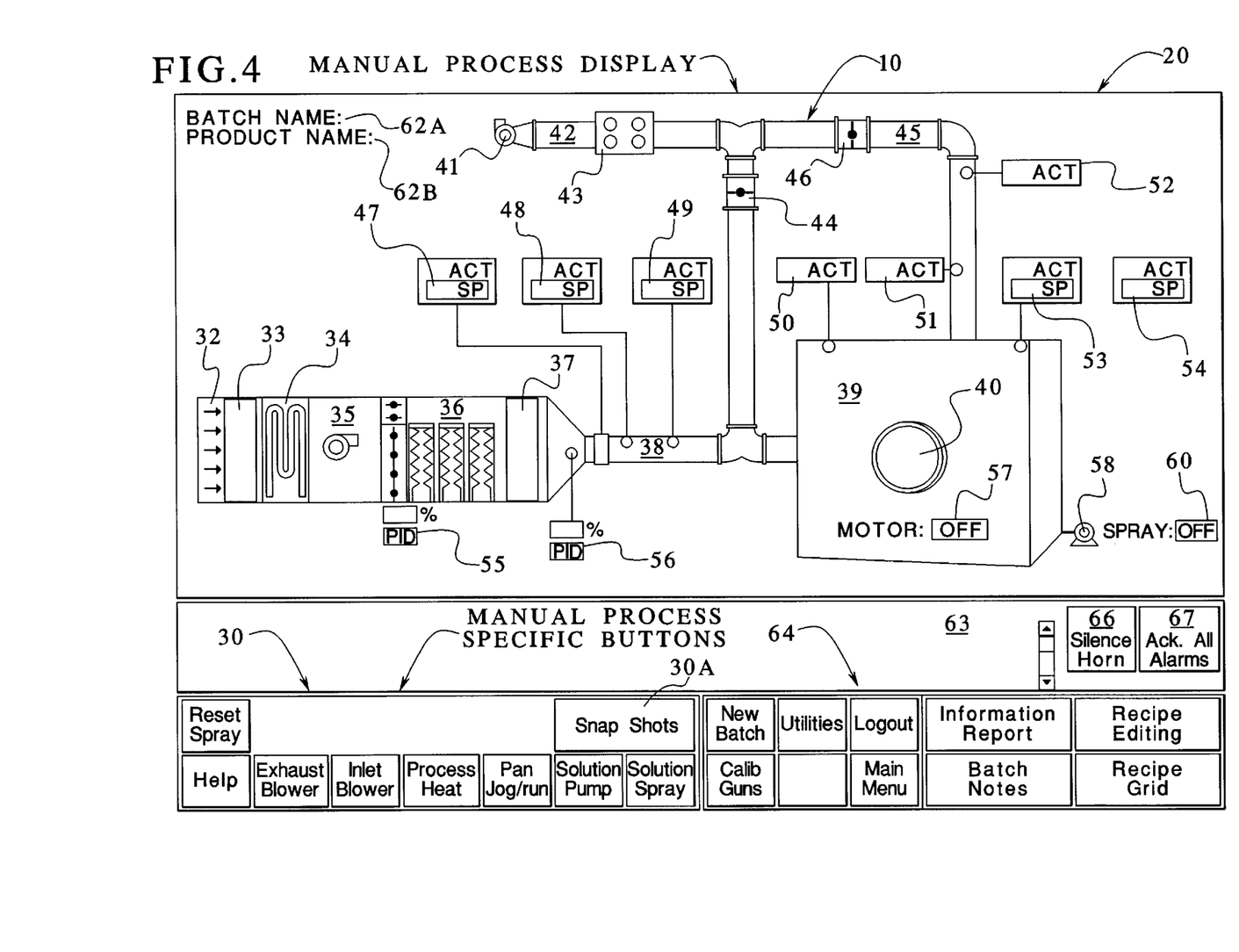
FIG. 4 shows the overall control or run process screen but without the pop-up screen of FIG. 3.

Also illustrated in FIG. 4 are various operating parameters also known as set points for the batch processing machine. In the machine example shown in FIG. 4, typical parameters might be inlet air flow 47; inlet dewpoint 48; inlet air temperature 49; product temperature 50; exhaust temperature 51; exhaust dewpoint 52; pan pressure 53; and a spray amount 54. Each of these parameters has displayed an actual value (ACT) thereof. For parameters 47, 48, 49, 53 and 54 additionally a set point (SP) indication is also provided adjacent to the actual (ACT) value.

Additionally, PID percentage indications (PID stands for Proportional Integral Derivative) are provided for the heat control 36 as a PID percent indication 55 and as a humidifier PID percent indication at 56.

A motor off/on indicator 57 is provided at the mixing unit block 39. Also a solution pump 58 is provided connecting to the mixing unit 39 along with a spray indicator status at 60.

At the upper left-hand corner at 62A and 62B, batch name and product name are indicated.

63 is an alarm display window. Block 64 indicates system buttons. Block 65 contains supervisory buttons. 66 is a silence button and 67 is an acknowledge alarm button.

The PID percent indication will now be explained. The PID represents a control loop which in the case of the heat control controls temperature of the air flow and in the case of the humidifier controls humidity of air flow entering the machine. The percent indicator indicates how open the steam valve is to obtain a desired temperature of the air and the percent indicator for the humidifier is an indicator of how open the humidifier valve is.

To operate in the manual mode, the operator clicks on the various set points on the screen to set them to the desired values. The actual values will then attempt to attain these desired set points during the manual operation. Thereafter, the operator controls the functioning of the machine manually with the manual process specific buttons 30. For example, the operator can manually control the following operations as shown in FIG. 4 at window 30: exhaust blower; inlet blower; process heat; pan jog/run; solution pump; solution spray; and reset spray.

One button in particular associated with the manual mode is the Snap Shot button 30A. This button provides a unique feature as compared to the prior art. When the operator presses this button the Snap Shot screen (FIG. 8) is opened.

Figure 5:
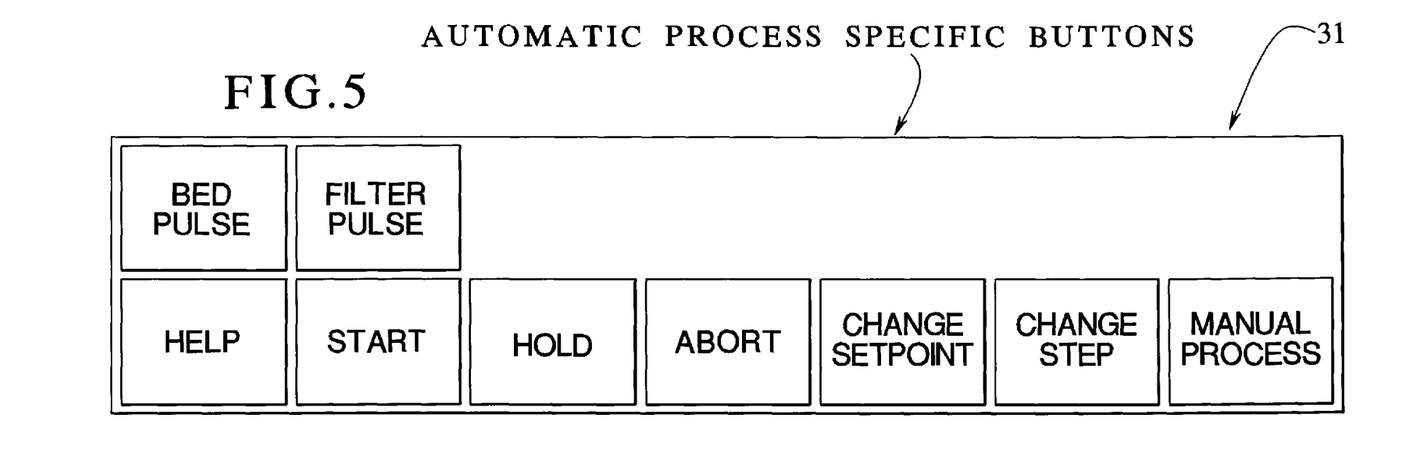
FIG. 5 shows a variation of the portion of the screen shown in FIG. 4 at the bottom left for automatic process specific buttons in lieu of manual process specific buttons shown in FIG. 4.

Now, automatic operation will be described. To achieve an automatic operation, it is assumed that an automatic recipe has already been defined as will be described later. First, the operator on the main menu shown in FIG. 2 activates the run process button 19. Then on the pop-up screen shown in FIG. 3, after the operator has defined the batch name and the product name along with stating his operator name, he then clicks on the auto process button 22. An auto process display then occurs which is the same as FIG. 4 except for the lower left-hand corner where automatic process specific buttons 31 shown in FIG. 5 are substituted for the manual process specific buttons 30 in FIG. 4. Using the automatic process specific buttons 31, the operator then clicks on the start button and the automatic process recipe then automatically runs. If the operator desires to abort the process, he clicks on the abort button. If the operator desires to suspend the recipe wherein the machine will automatically assume a process condition that will not destroy the product inside the machine, he clicks on the hold button. If the operator desires to change a set point running in the automatic process he activates the change set point button. To change a step in the process such as starting at step 5 instead of step 1 or to repeat a previous step such as step 2, the operator clicks on the change step button. The bed pulse and filter pulse buttons are manual function buttons specific to the particular machine and represent a manual function which is to occur at any time during the process independently of the automatic process which is running.

Figure 6:
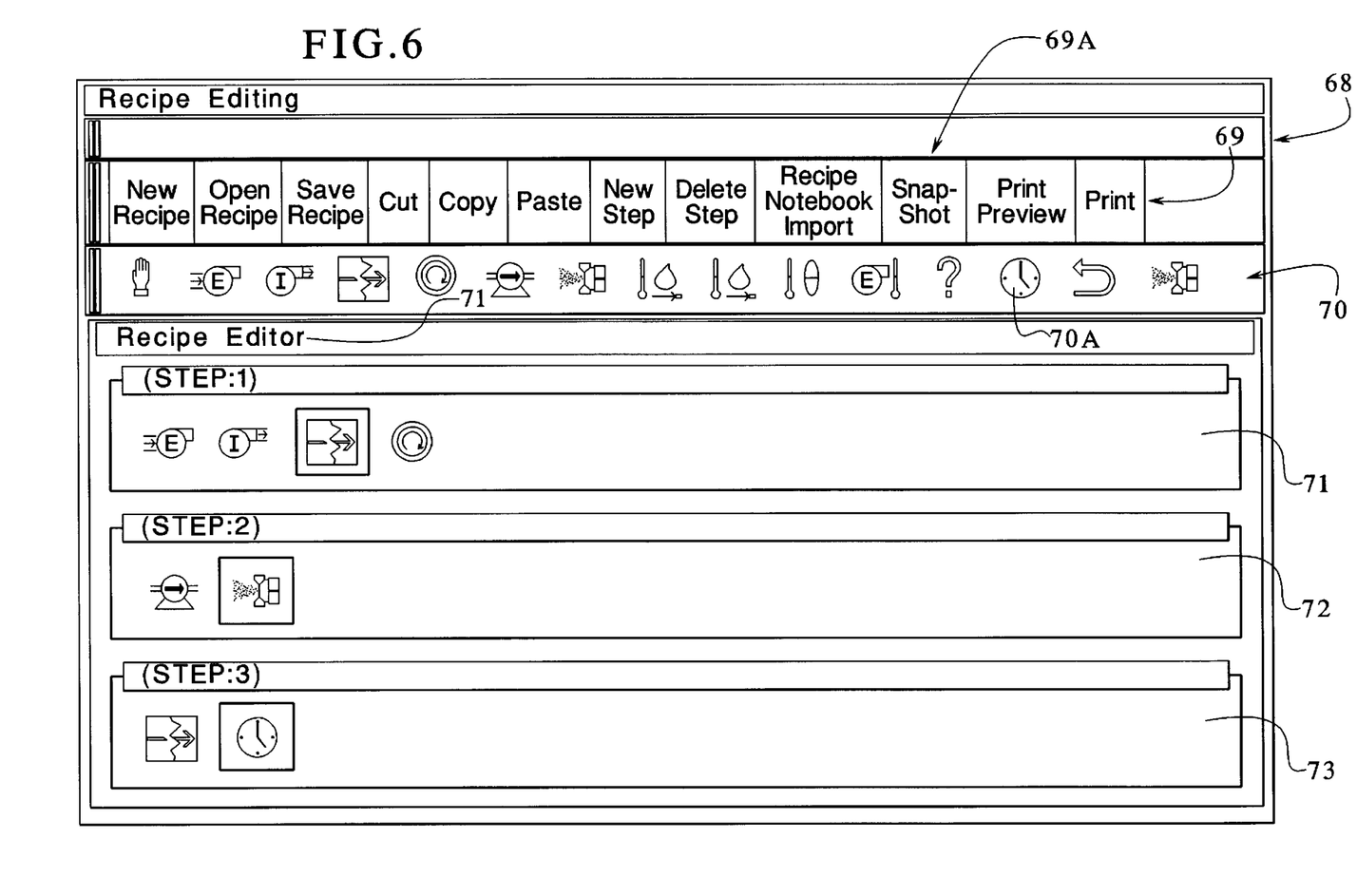
FIG. 6 shows a display screen for the recipe editing function of the system of the invention.

Now, with reference to FIG. 6, the creation of a recipe with what is known as the recipe editing screen will be described. To pull up the recipe editing screen, on the process display shown in FIG. 4 the operator clicks on the recipe editing button at the supervisory buttons window location 64 in the display screen shown at 20 in FIG. 4. It should also be noted that the Recipe Editing program can be run without the use of FIX32. The Recipe Editing is completely disassociated with FIX32 and operates within the Windows NT operating system.

The recipe editing screen 68 of FIG. 6 has an operational icon section 69 having a plurality of icons from left to right as follows: new recipe; open recipe; save recipe; cut; copy; paste; new step; delete step; recipe notebook; import snap shot; print; and preview print. These operational icons represent the critical functions that can be performed within the Recipe Editing Screen.

Below the operational icon 69 is a control element section 70 having icons indicating various control elements of the batch processing machine. These control element icons represent the major functions that are available within the batch processing machine 10. Control element icons are visible at the top of the computer screen and are used within the recipe to indicate the on/off status of the major functions that the machine can perform. Graphically displaying these control element icons on the computer screen, the developer of the recipe can visually determine the sequence of major functions that are to be executed by the processing machine 10.

At 100, the name of the recipe to be created or modified is indicated. Below the recipe name indication a display screen has a plurality of horizontally extending blocks, such as 71, 72 and 73 respectively representing step 1, step 2, and step 3 of the recipe to be created.

Creation of a recipe will now be described in more detail. The operator selects a control element icon of the batch processing machine at 70 and drags the icon down into the first step box 71. In the illustrated example for step 1 at 71, four icons have been dragged down representing four separate control elements of the batch processing machine all of which are to be activated and controlled automatically in step 1 according to the predefined set points which are set for those control elements by clicking on those individual control elements. When the operator is finished with step 1 he then moves to step 2 and drags respective control elements from the bar 70 down in to the rectangular step box 72. In this example, two control element icons have been dragged down. When the operator has finished with the second step he then moves to the third step 73 where it can be seen that the two control elements have been dragged down. The operator uses the operational icon 69 as for performing the functions previously indicated such as creating a new recipe, saving a recipe, opening a previously created recipe which is to be modified, or for cutting or copying various portions of a step or steps from one recipe to another recipe or from one step to another step.

Associated with every control element icon are the following data entry fields: set points, alarm conditions, and transition conditions associated with the major machine function that the control element icon represents. Set points are data entry fields that direct the machine 10 to control process variables (such as items 47, 48, and 49) to those values as entered by the person developing the recipe. Alarm conditions are data entry fields that monitor the status of a process variable associated with the control element icon. When the process variable exceeds or drops below the associated alarm condition data entry field, the system will create the appropriate alarm conditions. A transition condition are data entry fields that direct the automatic process recipe to transition to the next process step. When a process variable exceeds or drops below the associated alarm condition data entry field, the recipe would transition the automatic process to the next process step. If there are no more process steps and the transition condition has been satisfied, the recipe would shut down the automatic process. For example, icon 70A is the timing element so that in the case of step 3 at 73, the step terminates with time. Alternatively, in steps 71 and 72 since no time element is defined, the step ends when any of transition conditions associated with the control element icon have been satisfied.

Figure 7:
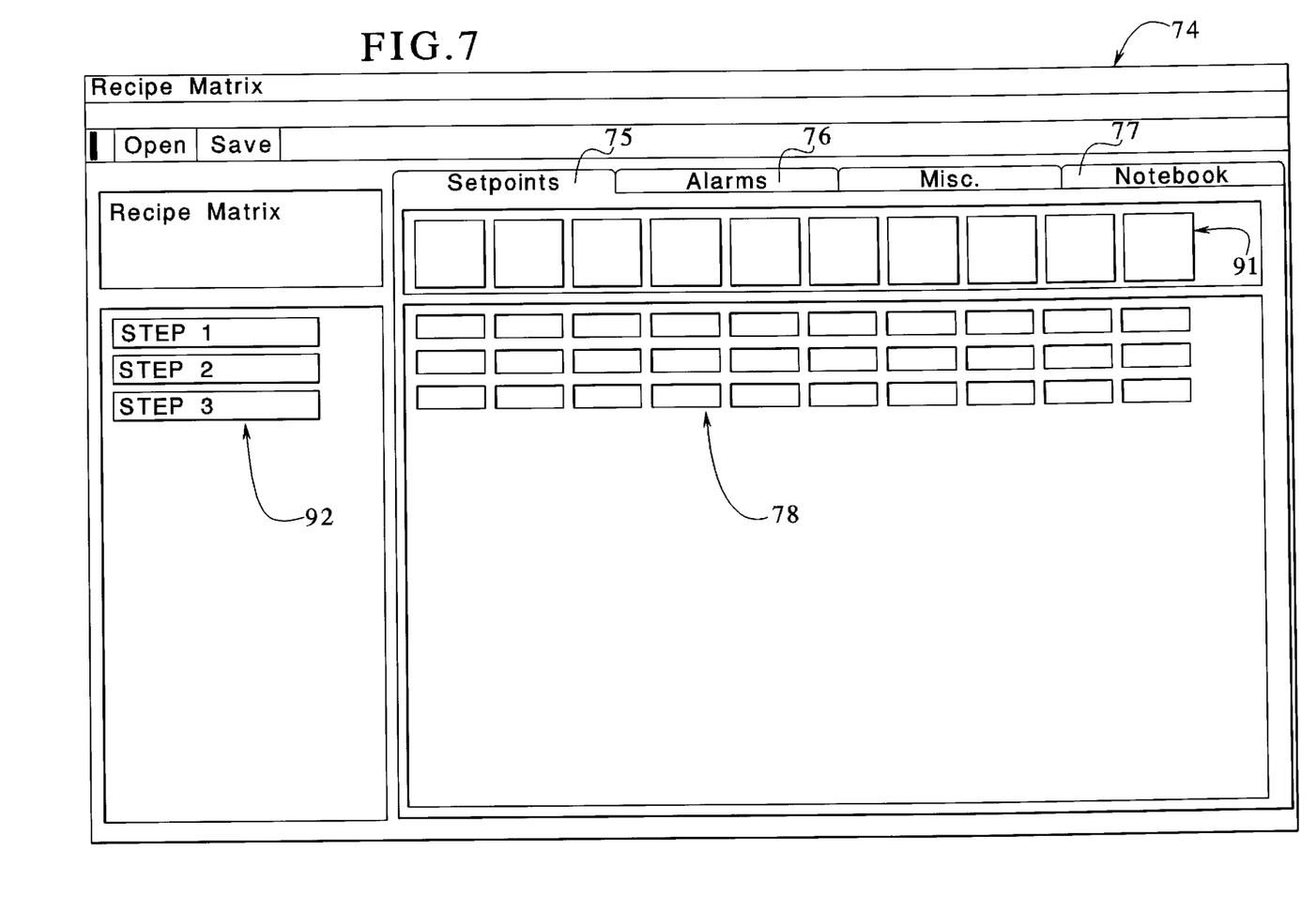
FIG. 7 shows a display screen for the recipe matrix reporting function of the system of the invention.

Now with respect to FIG. 7, a recipe matrix function of the present invention will be described. To call up the recipe matrix screen 74 shown in FIG. 7, on the process display screen shown in FIG. 4 the operator would click on the recipe matrix button at the supervisory buttons section 64 of the screen shown in FIG. 4. The recipe matrix screen 74 is a two-dimensional matrix or table for showing in convenient fashion various set points for various steps of a given recipe which is being run by the operator. With the set points folder 75 selected, a control element block 91 displays in the indicated example ten different control element set point titles horizontally across the screen. Vertically to the left of the matrix, step names for steps 1, 2 and 3, for example, are illustrated at 92. Various boxes within the matrix or table at 78 are then illuminated to indicate the set point for the particular control element corresponding to the particular step.

Alternatively to displaying the set points with the folder 75, system alarms 76 or system notes from a notebook 77 can be displayed horizontally for the various vertically displayed steps by clicking on the respective tab folders 76 or 77.

A recipe generated with the recipe editing function can be modified using the recipe matrix function. Both the recipe matrix function and the recipe editing function use the same set points, alarm conditions, and transition conditions. The primary difference between the recipe matrix function and the recipe editing function is that the data entry fields are not associated with graphical icons. Another primary difference is that a recipe created within the recipe matrix function cannot perform selected functions as the recipe editing function, such as new step, delete step, and import snap shot. Prior art systems did not allow a recipe to be generated with a recipe editing function and consequent modification within a recipe matrix function. Prior art systems also did not allow the operator to view recipes within different recipe formats (such as the recipe editing and the recipe matrix functions).

Figure 8:
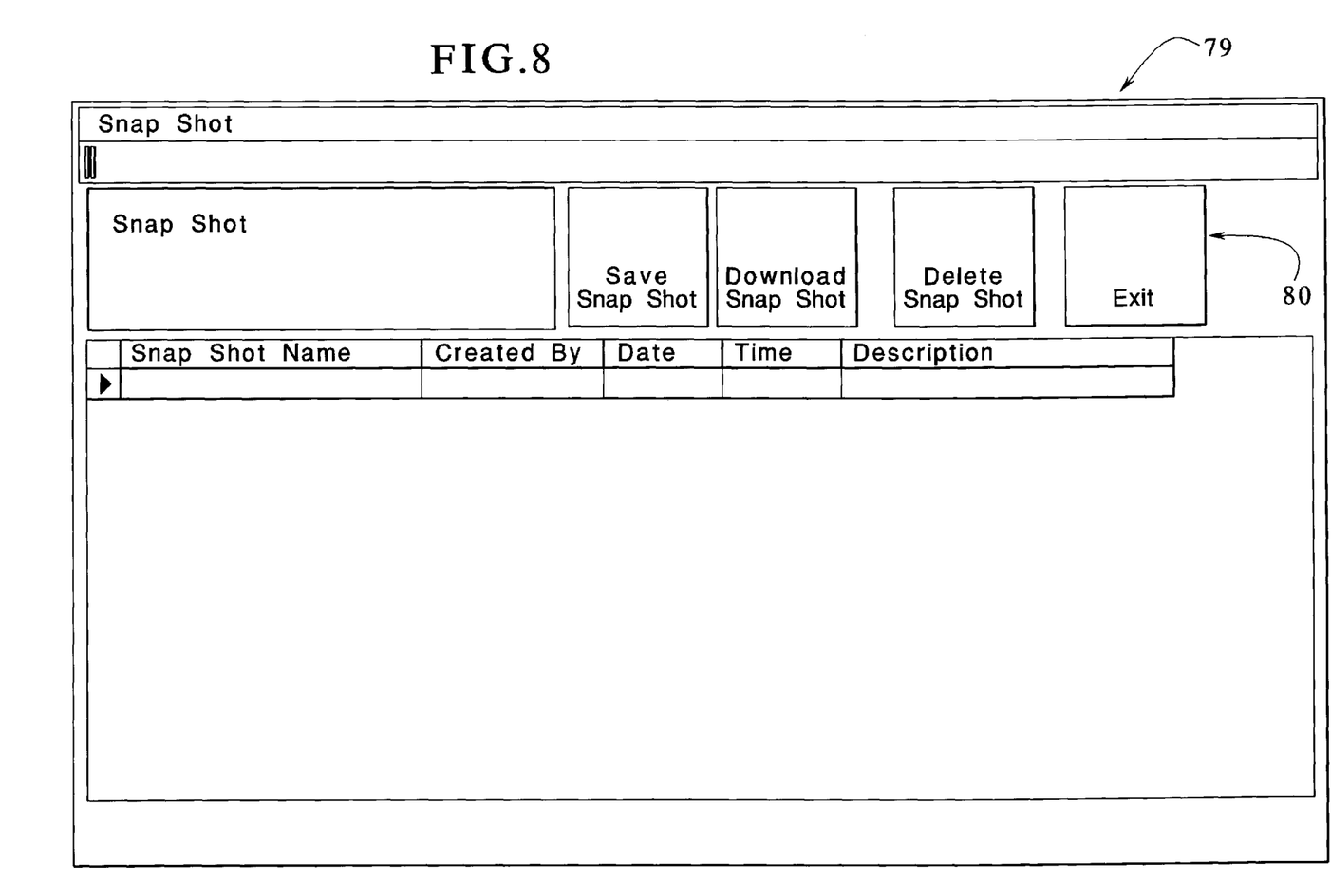
FIG. 8 shows a display screen for the snap shots function of the system of the invention.

The snap shot function of the present invention will now be described with respect to the snap shot screen shown at 79 in FIG. 8.

Snap shots are most useful in developing recipes for new products. With the system in the manual mode, experiments can be run for a particular process step of a machine in which various parameters are varied until a desired result is achieved. When this desired result for a particular step is achieved, a snap shot is taken of the actual manual set point values, which are then automatically stored within the system. This is done by giving the snap shot a name, indicating who created the snap shot, the date and the time of the snap shot, and a description of the process step involved. The save snap shot button is clicked on to save the snap shot.

There are two unique functions that the Compu 3 can perform with the stored snap shot. The first function is to download the stored set points directly into the Manual Mode process screen. This function would allow the operator running the process to automatically set all of the set points to known settings as defined by a previously stored snap shot. The operator can download the snap shots into the Manual Mode by clicking on the download snap shot button (shown in FIG. 8) and entering the name of the snap shot that should be downloaded. The second function that can be performed with a stored snap shot is to import the stored set points associated with a snap shot directly into the recipe editing screen as a complete process step. Importing of the snap shots is performed by clicking on the snap shot button 69A in FIG. 6 and entering the name of the snap shot that should be imported into the recipe editing screen. The system would then create a complete process step by automatically incorporating all of the control element icons associated with the snap shot (i.e. the developer of the recipe does not have to manually drag the icons into the process step and manually set the associated set points). Both of these functions are unique when compared to prior art systems.

A previously stored snap shot can be deleted by clicking the delete snap shot button in the group of function buttons 80. Additionally, the snap shot program can be exited by clicking on the exit button.

Figure 9:
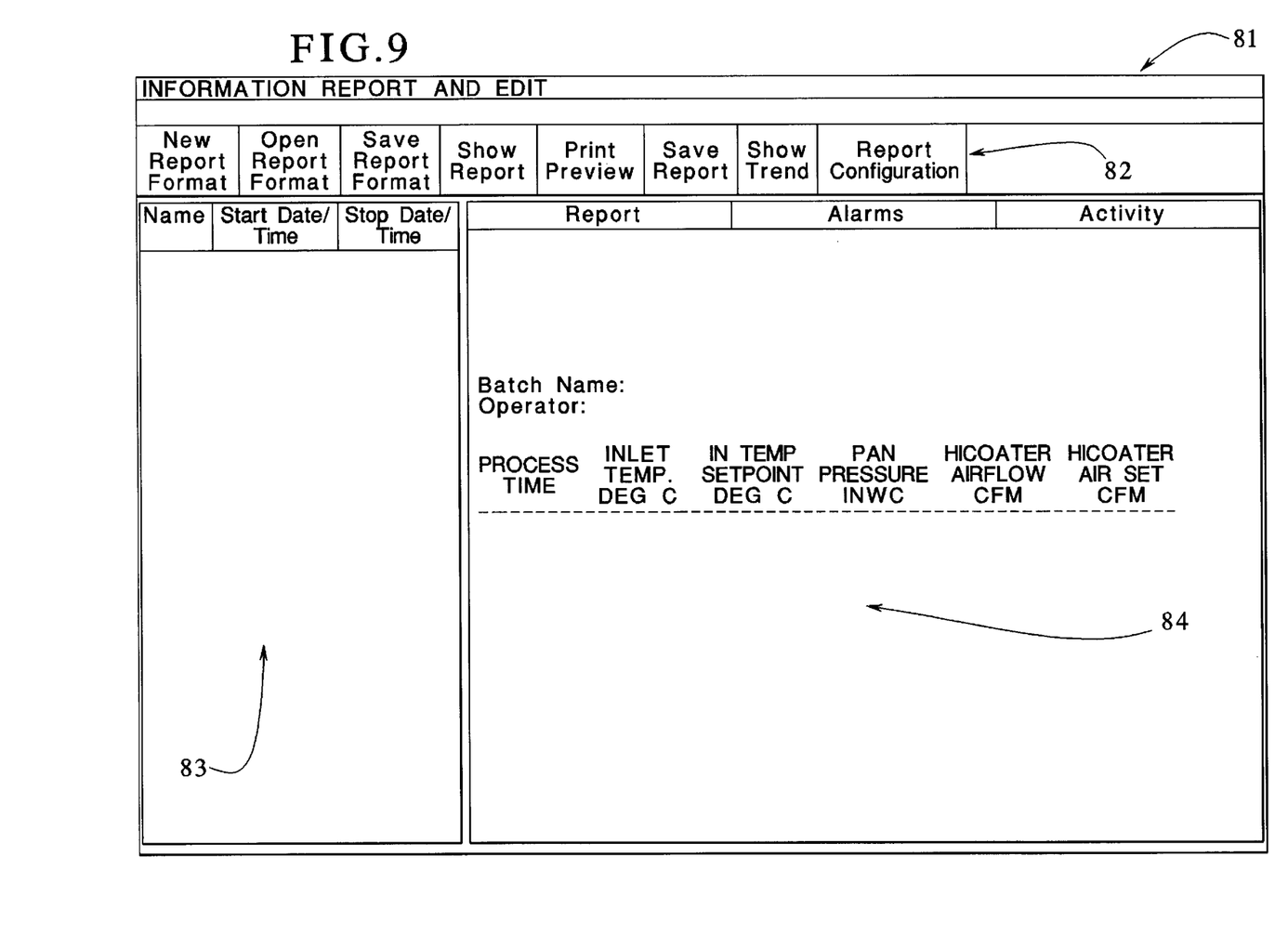
FIG. 9 shows a display screen for an information report and edit function according to the system of the invention.

All of the historical process information is stored within the Compu3™ control system. Since this information can consist of several processes that could span over several years, the information is very large and cumbersome to reference. The Compu3™ provides the user with an information report and edit screen 81 is shown in FIG. 9. This screen provides several functions to the person (user) interfacing with this screen including viewing the available processes that have been executed on the current Compu3™ system, viewing the data associated with those processes in a report format, modifying in a real-time environment the format and structure of those reports, and printing those reports to a hard copy. Other functions include viewing and printing graphs of historical processes and exporting the data into formats that can be read by common word processing or spreadsheet applications. The unique functions associated with the information report and edit screen deal with the ability to view, print and modify report formats in a real-time environment.

At the top of the information report and edit screen 81, a group of operational icons 82 which, when clicked on, perform the following functions as viewed in FIG. 9 from left to right: new report; open report format; save report format; show report; print; save report; show trend; and report configuration. At the left-hand side of the screen a batch listing 83 is provided with the name of the batch listing being displayed together with its start date/time and stop date/time. The central portion of the display screen provides the user with a preview of the current report format and associated data, as shown by item 84 in FIG. 9.

Figure 10:
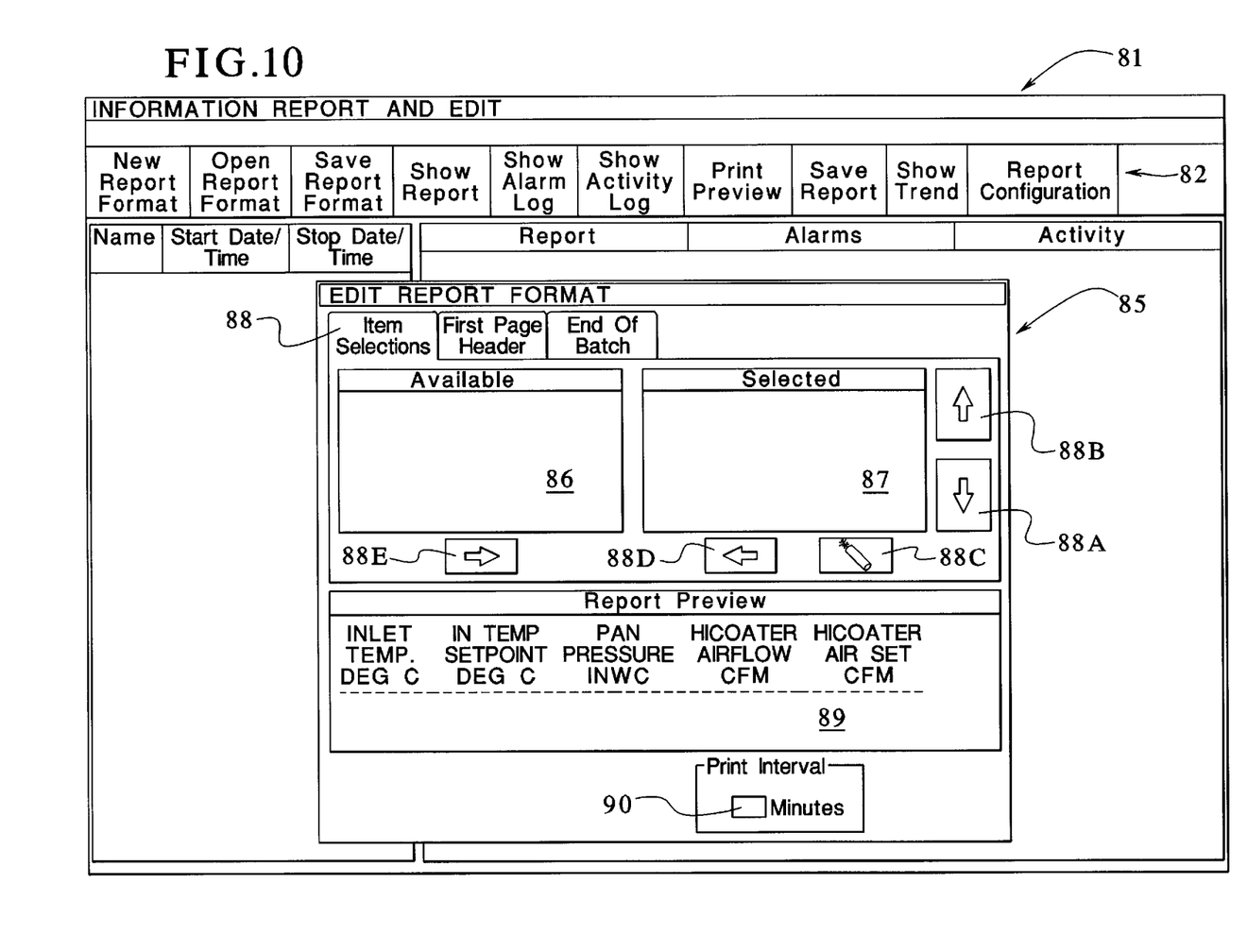
FIG. 10 shows an edit record format pop-up screen overlaying the information recorded in the screen of FIG. 9 according to the system of the invention.

Of course, the information report and edit screen 81 is called up onto the display by clicking on the "Information Report" button in the supervisory buttons group 64 shown in FIG. 4. If it is desired to change the configuration of the report, then the report configuration icon in the operational icon group 82 is clicked on and the pop-up screen 85 appears as shown in FIG. 10 overlaid upon the information report and edit screen 81 of FIG. 9. This pop-up screen 85, when the folder 88 (items selection) is clicked on, displays available process parameters that are stored within the system at 86 and displays the process parameters that are to be included in the report at 87. Editing buttons 88A, 88B, are employed for placing the process parameter column headers within the report. Items listed in the top of box 87 would appear on the left side of the printed report whereas items listed in the bottom of box 87 would appear on the right side of the printed report. Editing buttons 88C, 88D and 88E are used to determine which process variables should be selected for the batch report. Once the process parameters have been selected and placed accordingly, then in a report preview portion of the screen 89 the parameter titles corresponding to the process time increments can be displayed.

The print interval shown at 90 indicates the process time intervals in which the values for the various selected process parameters will be displayed. This box provides real-time editing features such that a change made to this data entry field would be automatically updated in the preview portion of the information report and edit screen.

Minor modifications might be suggested by those skilled in the art primarily in computer operating systems and SCADA development systems, however, it should be understood that our wish to embody within the scope of the patent warranted hereon all such modifications as reasonably and properly come with the scope of our contribution to the art.

We claim as our invention:

1. A method for operating a batch processing machine which produces a desired product, comprising the steps of:

providing a computer comprising a manual process display illustrating the batch processing machine and a plurality of control element operating parameters visually associated with different parts of the machine, each operating parameter having an associate set point representing a desired operating value for the respective operating parameter;

using the manual process display, an operator experiments with at least one step of a multi-step recipe for batch processing of the desired product;

upon completion of experimentation for said at least one step, the operator activates a snap shot function on the manual process display so that the computer then automatically stores a snap shot of an icon associated with each control element operating parameter and the associated set point existing at the time of the snap shot;

with a recipe editing display, editing the recipe for said batch processing of the desired product, each step of the recipe being represented by one or more icons with associated set points for the control element operating parameter associated with each icon, and for at least one of the steps of the recipe, retrieving the stored snap shot by use of the editing recipe display so as to automatically display for that step the stored one or more icons with associated stored set points for the one or more associated control element operating parameters; and by using the recipe created by the snap shot retrieval, automatically processing the batch of the desired product.

2. The method according to claim 1 including the step of also providing an automatic process display screen to automatically process the batch of the desired product with the recipe.

3. The method according to claim 2 wherein a pop-up screen is employed which overlays either the manual process display screen or the automatic process display screen to select a particular recipe for batch processing a product and to switch between the manual process display and the automatic process display.

4. The method according to claim 1 including the step of also providing a recipe matrix screen in addition to the recipe editing screen wherein control element indicia of the machine are set forth in one axis and steps of the process are set forth on a perpendicular axis, and wherein at locations of the matrix, control element parameter set point values are displayed which correspond with respective steps for the recipe being created, and wherein the computer has a capability of switching between the recipe editing screen and the recipe matrix screen.

5. The method according to claim 1 wherein the manual process screen displays both actual values and set point values for each control element operating parameter.

6. The method according to claim 1 wherein the machine displayed on the manual process display is displayed schematically, with one schematic portion indicating a gas treatment input having a plurality of control parameters associated therewith and a mixing chamber for holding the product to be batch processed and into which the gas is fed.

* * * * *